US012323496B2

(12) United States Patent
Dai et al.

(10) Patent No.: US 12,323,496 B2
(45) Date of Patent: *Jun. 3, 2025

(54) SYSTEMS AND METHODS FOR DYNAMICALLY ADJUSTING NOTIFICATION FREQUENCY FOR AN EVENT

(71) Applicant: Adeia Guides Inc., San Jose, CA (US)

(72) Inventors: Wei Dai, West Chester, PA (US); Sameer Jadhav, West Chester, PA (US); Sreevani Komerisheety, Collegeville, PA (US); Brandon Conley, Wynnewood, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,671

(22) Filed: Dec. 12, 2023

(65) Prior Publication Data

US 2024/0106915 A1     Mar. 28, 2024

Related U.S. Application Data

(63) Continuation of application No. 17/533,383, filed on Nov. 23, 2021, now Pat. No. 11,888,953, which is a
(Continued)

(51) Int. Cl.
*G06F 15/16* (2006.01)
*H04L 51/224* (2022.01)
(Continued)

(52) U.S. Cl.
CPC ............ *H04L 67/55* (2022.05); *H04L 51/224* (2022.05); *H04L 51/52* (2022.05); *H04L 67/306* (2013.01)

(58) Field of Classification Search
CPC ....... H04L 67/55; H04L 51/224; H04L 51/52; H04L 67/306
(Continued)

(56) References Cited

U.S. PATENT DOCUMENTS 6,239,794 B1    5/2001    Yuen et al.
6,564,378 B1    5/2003    Satterfield et al.
(Continued)

FOREIGN PATENT DOCUMENTS

CN      101882162 A     11/2010
CN      102348132 A      2/2012
(Continued)

OTHER PUBLICATIONS

Dejun et al., "Application Research of Interestingness Threshold in Association Rule," Southern Anhui Medical College, pp. 1-11 (2008).
(Continued)

*Primary Examiner* — Kaylee J Huang
(74) *Attorney, Agent, or Firm* — Haley Guiliano LLP

(57) ABSTRACT

Systems and methods are provided for dynamically adjusting notification frequency for a sporting event. During a sporting event, information related to the sporting event is received. A first level of interest of a user in the sporting event is determined. A performance metric of a competitor in the sporting event is determined. A second level of interest of the user in receiving notifications relating to the sporting event is generated as a function of the first level of interest and the performance metric. In response to determining that the second level of interest exceeds a notification frequency threshold, a notification is presented for the user that includes the information related to the sporting event when the information is received during the sporting event.

20 Claims, 10 Drawing Sheets

Related U.S. Application Data continuation of application No. 16/765,584, filed as application No. PCT/US2017/067696 on Dec. 20, 2017, now Pat. No. 11,212,353.

(51) Int. Cl.
*H04L 51/52* (2022.01)
*H04L 67/306* (2022.01)
*H04L 67/55* (2022.01)

(58) Field of Classification Search
USPC .................................. 709/206, 204, 207, 217
See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,606,636 B1* | 12/2013 | Keoshkerian | G06Q 30/0261 |
| | | | 705/14.5 |
| 10,453,312 B1* | 10/2019 | Weaver | G07F 17/3276 |
| 2002/0174430 A1 | 11/2002 | Ellis et al. | |
| 2005/0043088 A1* | 2/2005 | Nguyen | G07F 17/32 |
| | | | 463/29 |
| 2005/0251827 A1 | 11/2005 | Ellis et al. | |
| 2006/0217198 A1* | 9/2006 | Johnson | A63F 13/46 |
| | | | 463/40 |
| 2007/0203592 A1 | 8/2007 | Pennington | |
| 2008/0016205 A1 | 1/2008 | Svendsen | |
| 2008/0229352 A1* | 9/2008 | Pino | H04N 21/2543 |
| | | | 348/E7.071 |
| 2008/0319833 A1 | 12/2008 | Svendsen | |
| 2009/0132071 A1* | 5/2009 | Phillip | G06Q 30/02 |
| | | | 700/91 |
| 2010/0153885 A1 | 6/2010 | Yates | |
| 2011/0059799 A1 | 3/2011 | Hirano et al. | |
| 2012/0197947 A1* | 8/2012 | Tocci | A63B 71/0616 |
| | | | 707/802 |
| 2014/0033081 A1* | 1/2014 | Fernandez | G06F 16/9535 |
| | | | 715/764 |
| 2015/0221177 A1 | 8/2015 | Glancy | |
| 2015/0264006 A1 | 9/2015 | Parra | |
| 2017/0257654 A1* | 9/2017 | Branch | H04N 21/8456 |
| 2017/0326430 A1 | 11/2017 | Phillip | |
| 2020/0314196 A1 | 10/2020 | Dai et al. | |
| 2022/0094759 A1 | 3/2022 | Dai et al. | |

FOREIGN PATENT DOCUMENTS

| | | |
|---|---|---|
| CN | 105897847 A | 8/2016 |
| CN | 106168971 A | 11/2016 |
| CN | 106682013 A | 5/2017 |
| CN | 106971006 A | 7/2017 |
| CN | 106993208 A | 7/2017 |
| JP | 2001283077 A | 10/2001 |

OTHER PUBLICATIONS

PCT International Search Report for International Application No. PCT/US2017/067696, dated Sep. 17, 2018 (17 pages).

* cited by examiner

SYSTEMS AND METHODS FOR DYNAMICALLY ADJUSTING NOTIFICATION FREQUENCY FOR AN EVENT

CROSS-REFERENCE TO RELATED APPLICATIONS

This application is a continuation of U.S. patent Ser. No. 17/533,383, filed Nov. 23, 2021, which is a continuation of U.S. patent Ser. No. 16/765,584, filed May 20, 2020, now U.S. Pat. No. 11,212,353, which is a national stage application under 35 U.S.C. § 371 of International Application PCT/US2017/067696, filed Dec. 20, 2017, which is hereby incorporated by reference herein in their entireties.

BACKGROUND

Throughout a given day, users receive many types of notifications (e.g., emails, SMS messages, alerts, etc.). Some of these notifications are very important for the user to receive at a particular time while others are not. For example, a user may be interested in following a given sporting event but may not be interested in receiving play-by-play updates and instead may only like to know the final score. But conventional systems have no mechanism to curate which notifications the user should or should not receive. This results in the user being inundated with notifications and possibly missing some that are important to the user. For example, the user may receive play-by-play event notifications for the sporting event and may miss an important SMS message from a family member. In addition, sending such notifications, which are not necessarily needed, to various users throughout a given day consumes a substantial amount of bandwidth and resources (locally and at the server) that could otherwise be used for providing desired content.

SUMMARY

Accordingly, systems and methods are provided for dynamically adjusting notification frequency for an event. In particular, systems and methods are provided for increasing or decreasing the number of notifications a user receives about a given sporting event. The frequency of notifications that are provided to the user changes based on a level of interest a user has in a given sporting event and a performance metric of a competitor in the sporting event. For example, the system may determine that the user is somewhat interested in a football game. In addition, the system may determine that a team the user is a fan of in the football game is performing poorly (e.g., is losing the game). Accordingly, the system changes notification frequency related to the football game as a function of these two factors (level of user interest and performance of the team). In particular, the system may avoid notifying the user about the play-by-play updates in the football game the user is somewhat interested in because the user's team is losing the game. Instead, the system may inform the user about scoring events whenever they occur or about the final score when the game ends. Alternatively, if the user is determined to be very interested in the football game and the user's team is losing, the system may provide the user with the play-by-play updates. The described systems and methods result in customizing the number of notifications that are sent to a given user based on that user's interests and needs.

In some embodiments, information related to a sporting event is received during a sporting event. For example, during a sporting event, such as a football game, many types of updates are received. Such updates include changes to player statistics, scoring events, team formation changes, lineup changes, tournament updates, rain delays, etc. Each of these updates may be determined by accessing various sources, such as metadata associated with a media asset featuring the sporting event, processing closed-captioning information representing announcements made by a commentator, and/or accessing an online database that tracks in real time information associated with a given sporting event. In some implementations, once a sporting event of interest is selected (e.g., by receiving a user selection of a sporting event and/or automatically identifying an event of interest), the system may access any one of these sources to detect information, such as real-time information, related to the sporting event.

In some embodiments, a first level of interest of a user in the sporting event may be determined. For example, the system may access a profile associated with the user to determine sporting attributes the user specifies for various events. For example, the user may store in the profile various levels of interest in different competitors and/or types of sporting events. The user may also post to a social network various updates associated with sporting events. Depending on the number of updates the user posts in a given time frame, the level of interest in the sporting event changes (e.g., a user who frequently comments about a sporting event may be determined to have a higher level of interest than one who comments once in while). The system may retrieve attributes from the sporting event and compare those attributes with those stored in the user profile to determine a level of interest the user has in the sporting event. For example, the user's profile may specify that the user set a level of 5 out of for football games and 2 out of 5 for baseball games. In response to determining that the sporting event is a football game, the system may determine the user's level of interest to be a 5 (maximum level). In some embodiments, the system may determine if the user participates in a fantasy league associated with the sporting event. In such cases, the system may automatically set the user interest level in the sporting event to a maximum value.

In some embodiments, a performance metric of a competitor in the sporting event is determined. For example, the system may identify who the competitors are in the sporting event (e.g., players, teams, coaches, etc.) by accessing any one of the sources mentioned above. For example, the competitors may be determined by accessing various sources, such as metadata associated with a media asset featuring the sporting event, processing closed-captioning information representing announcements made by a commentator, and/or accessing an online database that tracks in real time information associated with a given sporting event. The sources may include a performance metric for the given competitor. For example, the system may determine a current score of a team in a football game and/or a number of complete passes a given player made in the football game.

In some embodiments, a second level of interest of the user in receiving notifications relating to the sporting event may be generated as a function of the first level of interest and the performance metric. For example, the system may combine the level of interest the user has in the football game with the determined performance metric of the competitor to generate the second level of interest. In particular, suppose the user is determined to have a maximum level of interest in the sporting event but that the user's football team is losing the game. The system may determine that the performance metric of the football team is a 1 out of 5. The total for the second level of interest may be 10 and combining the maximum level of interest the user has in the football game of 5 with the performance metric of 1 results in a second level of interest being a 6 out of 10. Alternatively, suppose a second user is determined to have a low level of interest (e.g., 1 out of 5) in the sporting event but that the user's football team is winning the game. The system may determine that the performance metric of the football team is a 4 out of 5. The total for the second level of interest may be 10 and combining the low level of interest the second user has in the football game of 1 with the performance metric of 4 results in a second level of interest being a 5 out of 10 for the second user.

In some embodiments, in response to determining that the second level of interest exceeds a notification frequency threshold, a notification may be presented for the user that includes the information related to the sporting event when the information is received during the sporting event. For example, continuing with the previous example, the system may determine that the notification frequency threshold is a 5 and that because the second level of interest is a 6, the threshold is exceeded. Accordingly, the system may present the notification that includes the information when the information is received. For example, the system may inform the user about a scoring event, line changes, player statistics, etc., even though the user's football team is losing the game, by way of an SMS message, email, pop-up overlay on top of a media asset, audible alert, etc. The notification may be provided to the user on a second screen device or a primary device the user is using to access a media asset featuring the sporting event. However, suppose for the second user, the second level of interest of 5 does not exceed the notification frequency threshold of 5. In some embodiments, in response to determining that the second level of interest does not exceed the notification frequency threshold, the information related to the sporting event may not be presented to the user at all or may be presented at a later time (e.g., at the end of the game) rather than when the information is received during the sporting event. For example, continuing with the previous example, the system may not present the notification to the second user that includes the information when the information is received. For example, the system may delay informing the second user about a scoring event, line changes, player statistics, etc., until the end of the game or until another event happens (e.g., half-time in the game), even though the first user is informed of these updates as they take place.

In some embodiments, the second level of interest may be generated by combining the interest level of the user and the performance metric based on weights assigned to these factors in a function. For example, the function may be computed in accordance with $SI=x*UI+y*PM$, where SI is the second interest level, UI is the user interest level in the sporting event, PM is the performance metric of the competitor, and x and y are weights. In particular, a first weight may be assigned to a first value representing interest and a second weight may be assigned to a second value representing performance. The first weight may be combined with the first level of interest to generate a first result and the second weight with the performance metric to generate a second result. For example, the level of interest in the sporting event may be multiplied by the first weight and the performance metric may be multiplied by the second weight. The first result may be combined with the second result to generate the second level of interest. For example, suppose the first weight may have a value of 0.7 and the second weight may have a value of 0.3. Continuing with the previous example, the user interest level of 5 may be multiplied by the first weight 0.7 to generate the first result of 3.5 and the performance metric of 1 may be multiplied by the second weight 0.3 to generate the second result of 0.3. Combining these two results may return a value of 3.8 for the second level of interest. In such cases, despite a maximum level of interest the user has in the sporting event, the notification threshold may not be exceeded because of the low value of the weight associated with the interest level of the user. The weights may be set to any positive or negative integer or non-integer value.

The weights may be assigned automatically or based on user input based on an importance level determined for the given factor in setting the second level of interest in receiving notifications. For example, a user may be wish to have more weight given to the user's interest in the sporting event than the performance. In such cases, the user may set a higher weight value to the interest level than the performance. This may result in a greater likelihood of the user being notified in case of an event updated even though the interest level is low and the performance metric is high. In some implementations, the weights may be assigned automatically based on predetermined values.

In some embodiments, the weights may be assigned based on information gathered from a social network. For example, a social network may be accessed to determine an amount of chatter related to the sporting event. For example, the system may identify communications posted by various users to a social network. The system may process these communications to determine which of the communications relate to the sporting event. This may be performed by analyzing keywords in the communications and comparing the keywords to metadata associated with the sporting event to identify matches. The system may set a time threshold to measure how many communications are posted to the network related to the sporting event within the time threshold. If a sufficient number is detected (e.g., more than a threshold number within the time threshold), the system may determine that the sporting event is trending. In such circumstances, the system may dynamically adjust the second weight based on the amount of chatter relating to the sporting event. For example, the system may increase the weight assigned to the performance metric. This may result in the user being notified about updates during the sporting event even though the user may not be interested in the sporting event and/or the performance metric is low. In particular, if the sporting event is trending the system may increase the second weight to have a value of 5. In computing the second interest level, the result may be invariable more than 5 which may result in the notification frequency threshold being exceeded despite a low value of user interest in the sporting event (e.g., 2) and a low value of competitor performance metric (e.g., 1).

In some embodiments, the information relating to the sporting event is received by detecting that the sporting event has concluded. In such cases, score information relating to the sporting event is accessed (e.g., from one of the above sources) in response to detecting that the sporting event has concluded to retrieve a final outcome of the sporting event. In some implementations, the competitor is a team and a database is searched to find the sporting event and to analyze the final outcome to determine whether the team won or lost the sporting event. In some embodiments, conclusion of the sporting event may include the end of one particular game a team is playing and/or the end of a season of the sporting event (e.g., the end of the final round in a tournament).

In some embodiments, the information includes at least one of a score during the sporting event, competitor information associated with a competitor in the sporting event, competitor information associated with a competitor related to the sporting event, and player information. In addition, the information may be received before the sporting even concludes. In such cases, in response to determining that the second level of interest does not exceed the notification frequency threshold, the information related to the sporting event may be stored. For example, the information may be stored on a server or at the user device. Conclusion of the sporting event maybe detected and, in response, at such time the notification may be presented to the user that includes the information related to the sporting event.

In some embodiments, the information includes a final score in the sporting event. In such cases, the performance metric is determined to indicate that the competitor has lost the sporting event based on the final score. The notification is prevented from being presented to the user in response to determining that the performance metric indicates that the competitor has lost. For example, suppose the user has a high level of interest in the sporting event and that the performance metric indicates that the user's team has lost. In such cases, the system may determine that the second level of interest is lower than a threshold and prevent notifying the user about the final score. In particular, although the user is interested in the football game, the system may not inform the user about the game if the user's team lost.

In some embodiments, the system determines at least one of a type associated with the sporting event and a competition level associated with the sporting event. For example, the system may determine that the type of sporting event is a football game and the competition level is a round in playoffs or a tournament in the sport. The system may search a database, based on the determined at least one of the type and the competition level, to identify the notification frequency threshold of a plurality of notification frequency thresholds that is associated with the at least one of the type and the competition level, wherein a first notification frequency threshold associated with at least one of a first type of sporting event and a first competition level is lower than a second notification frequency threshold associated with at least one of a second type of sporting event and a second competition level.

In some embodiments, the system may determine an amount representing a difference between the notification frequency threshold and the second level of interest. For example, the system may subtract the value of the notification frequency threshold from the determined second level of interest. Continuing with the previous example, suppose the threshold is set to 5 and the second level of interest is determined to be 6. In such cases, the difference may be determined to be 1. The system may compare the difference to a device threshold and select a first device or a second device based on the device threshold. For example, a first device of a plurality of devices associated with the user may be selected in response to determining that the amount exceeds the device threshold. A second device of the plurality of devices associated with the user may be selected in response to determining that the amount does not exceed the device threshold. The notification is caused to be presented to the user at the selected one of the first and second devices. The device threshold may determine which device the user receives notifications at. For example, different devices may be associated with different thresholds. The selection of the device may be determined based on how close or far the second level of interest is determined to be to the notification frequency threshold. This may determine the level of urgency such that if the second level of interest is very close to the notification frequency threshold, a device with low priority is selected (e.g., a mobile phone) whereas if the second level of interest is very far and exceeds the notification frequency threshold, a device with high priority is selected (e.g., a television being used to consume a media asset).

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
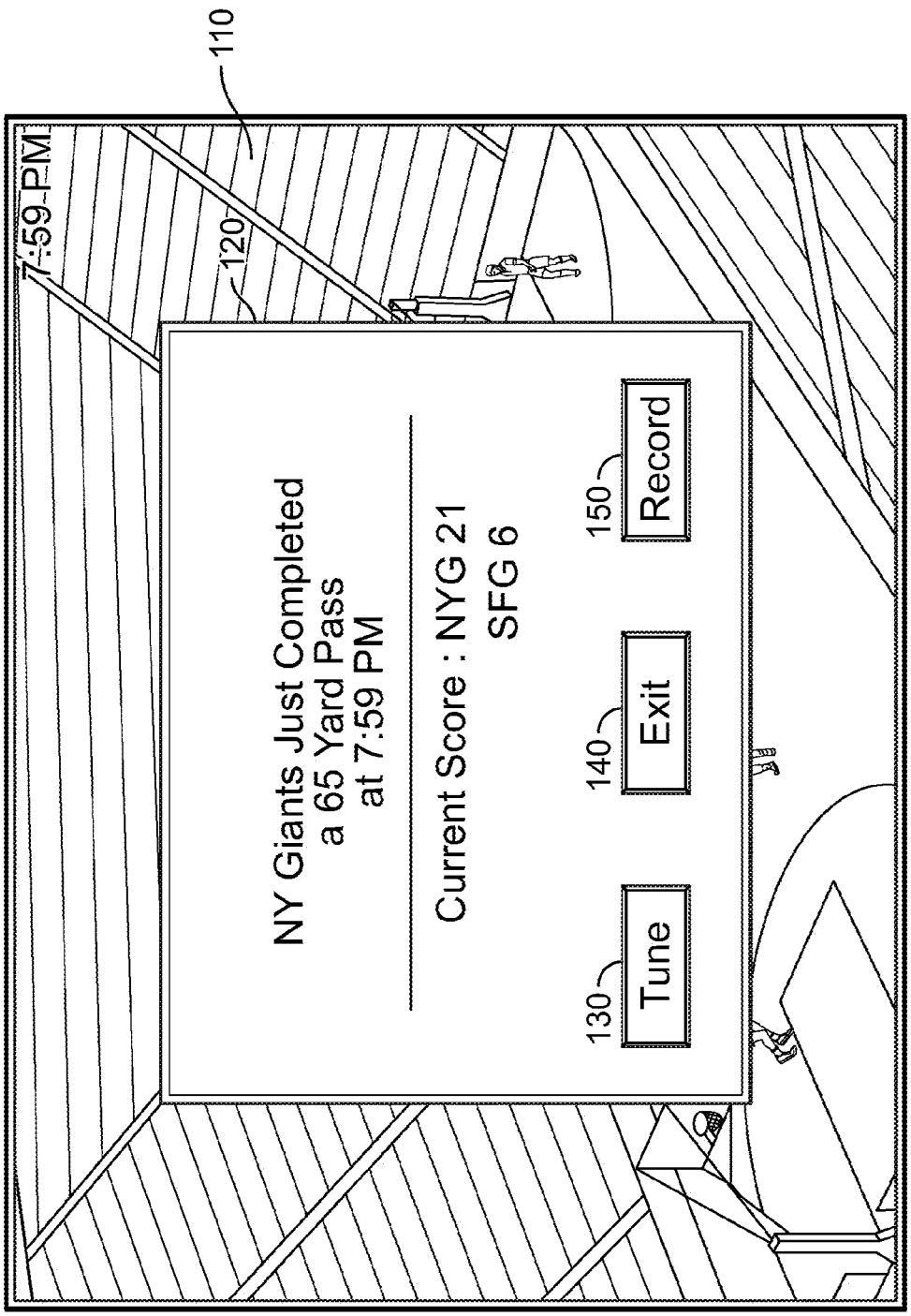
FIG. 1 shows an exemplary display screen of a notification with sporting event information being provided in accordance with some embodiments of the disclosure.

Accordingly, systems and methods are provided for dynamically adjusting notification frequency for an event. In particular, systems and methods are provided for increasing or decreasing the number of notifications a user receives about a given sporting event. The frequency of notifications that are provided to the user changes based on a level of interest a user has in a given sporting event and a performance metric of a competitor in the sporting event. For example, the system may determine that the user is somewhat interested in a football game. In addition, the system may determine that a team the user is a fan of in the football game is performing poorly (e.g., is losing the game). Accordingly, the system changes notification frequency related to the football game as a function of these two factors (level of user interest and performance of the team). In particular, the system may avoid notifying the user about the play-by-play updates in the football game the user is somewhat interested in because the user's team is losing the game. Instead, the system may inform the user about a scoring event whenever they occur or about the final score when the game ends. Alternatively, if the user is determined to be very interested in the football game and the user's team is losing, the system may provide the user with the play-by-play updates. The described systems and methods result in customizing the number of notifications that are sent to a given user based on that user's interests and needs.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

FIG. 1 shows an exemplary display screen 100 of a notification with sporting event information being provided in accordance with some embodiments of the disclosure. In particular, in some embodiments, information related to a sporting event is received during a sporting event. For example, during a sporting event, such as a football game, many types of updates received. Such updates include changes to player statistics, scoring events, team formation changes, lineup changes, tournament updates, rain delays, etc. Each of these updates may be determined by accessing various sources, such as metadata associated with a media asset featuring the sporting event, processing closed-captioning information representing announcements made by a commentator, and/or accessing an online database that tracks in real time information associated with a given sporting event. In some implementations, once a sporting event of interest is selected (e.g., by receiving a user selection of a sporting event and/or automatically identifying an event of interest), the media guidance application may access any one of these sources to detect information, such as real-time information, related to the sporting event.

For example, the media guidance application may determine that the user is a fan of a particular team (e.g., the NY Giants football team). The media guidance application may further determine that the team is currently playing a game. The game may have a corresponding media asset or may not. In either case, the media guidance application may access real-time information associated with the game to determine any updates discussed above. In some circumstances, the media guidance application may search a database of sporting event information to identify information pertaining to the particular team.

In some embodiments, a first level of interest of a user in the sporting event may be determined. For example, the media guidance application may access a profile associated with the user to determine sporting attributes the user specifies for various events. For example, the user may store in the profile various levels of interest in different competitors and/or types of sporting events. In particular, the media guidance application may receive input from the user specifying from a range of 1-5 a level of like or dislike for a particular team, sport, player, etc.

In some embodiments, the user may post to a social network various updates associated with sporting events. Depending on the number of updates the user posts in a given time frame, the level of interest in the sporting event changes (e.g., a user who frequently comments about a sporting event may be determined to have a higher level of interest than one who comments once in while). For example, the media guidance application may identify a social network with which the user has an account (e.g., Facebook). The media guidance application may search the social network to determine whether the user has previously submitted or is currently submitting messages pertaining to a sporting event of a particular type or to a player. If the media guidance application identifies that a threshold number of messages were posted within a given time (e.g., two hours), the media guidance application may store a high level of interest for the sporting event and/or player mentioned in the message (e.g., a level of 5). If the media guidance application identifies that fewer than a threshold number of messages were posted within a given time (e.g., two hours), the media guidance application may store a medium level of interest for the sporting event and/or player mentioned in the message (e.g., a level of 3).

The media guidance application may retrieve attributes from the sporting event and compare those attributes with those stored in the user profile to determine a level of interest the user has in the sporting event. For example, the user's profile may specify that the user set a level of 5 out of 5 for football games and 2 out of 5 for baseball games. In response to determining that the sporting event is a football game, the system may determine the user's level of interest to be a 5 (maximum level). In some embodiments, the media guidance application may determine if the user participates in a fantasy league associated with the sporting event. In such cases, the media guidance application may automatically set the user interest level in the sporting event to a maximum value.

In some embodiments, a performance metric of a competitor in the sporting event is determined. For example, the media guidance application may identify who the competitors are in the sporting event (e.g., players, teams, coaches, etc.) by accessing any one of the sources mentioned above. For example, the competitors may be determined by accessing various sources, such as metadata associated with a media asset featuring the sporting event, processing closed-captioning information representing announcements made by a commentator, and/or accessing an online database that tracks in real time information associated with a given sporting event. The sources may include a performance metric for the given competitor. For example, the media guidance application may determine a current score of a team in a football game and/or a number of complete passes a given player made in the football game. Specifically, suppose the media guidance application identifies a current football game featuring the user's team (e.g., the NY Giants); the media guidance application may access the database to retrieve a performance metric of the team, players, and/or any other entity featured in the game. The metric may include a score, player statistics, trending information, plays being made, lineup changes, etc.

In some embodiments, a second level of interest of the user in receiving notifications relating to the sporting event may be generated as a function of the first level of interest and the performance metric. For example, the media guidance application may combine the level of interest the user has in the football game with the determined performance metric of the competitor to generate the second level of interest. In particular, suppose the user is determined to have a maximum level of interest in the sporting event but that the user's football team is losing the game. The media guidance application may determine that the performance metric of the football team is a 1 out of 5. The total for the second level of interest may be 10 and combining the maximum level of interest the user has in the football game of 5 with the performance metric of 1 results in a second level of interest being a 6 out of 10. Alternatively, suppose a second user is determined to have a low level of interest (e.g., 1 out of 5) in the sporting event but that the user's football team is winning the game. The media guidance application may determine that the performance metric of the football team is a 4 out of 5. The total for the second level of interest may be 10 and combining the low level of interest the second user has in the football game of 1 with the performance metric of 4 results in a second level of interest being a 5 out of 10 for the second user.

In some embodiments, in response to determining that the second level of interest exceeds a notification frequency threshold, a notification may be presented for the user that includes the information related to the sporting event when the information is received during the sporting event. For example, continuing with the previous example, the media guidance application may determine that the notification frequency threshold is a 5 and that because the second level of interest is a 6, the threshold is exceeded. Accordingly, the media guidance application may present a notification 120 that includes the information when the information is received. For example, the media guidance application may inform the user about a scoring event, line changes, player statistics, etc., even though the user's football team is losing the game, by way of an SMS message, email, pop-up overlay on top of a media asset, audible alert, etc. In particular, notification 120 may be provided as an overlay over a given media asset 120 being accessed by the user. Notification 120 may specify the time at which the information was received (e.g., 7:59 PM) and the performance metric that was determined (e.g., a current score). Notification 120 may include the sporting event in which the user interest was determined (e.g., NY Giants). As shown, notification 120 was provided to the user substantially contemporaneously at 7:59 PM when the information was received at 7:59 PM. In particular, because the second level of interest exceeds the notification frequency threshold, the media guidance application provides the notification as soon as the media guidance application identifies or receives the information associated with the sporting event (e.g., a completed pass or a score change).

Notification 120 may include any number of options. For example, notification 120 may include a tune option 130. In response to receiving a user selection of tune option 130, the media guidance application may access a source that is transmitting a media asset featuring the sporting event. For example, notification 120 may include a record option 150. In response to receiving a user selection of record option 150, the media guidance application may store a media asset from a source that is transmitting a media asset featuring the sporting event starting from the time when the information was received (e.g., starting at 7:59 PM even though the sporting event started earlier, e.g., at 6:00 PM).

Figure 2:
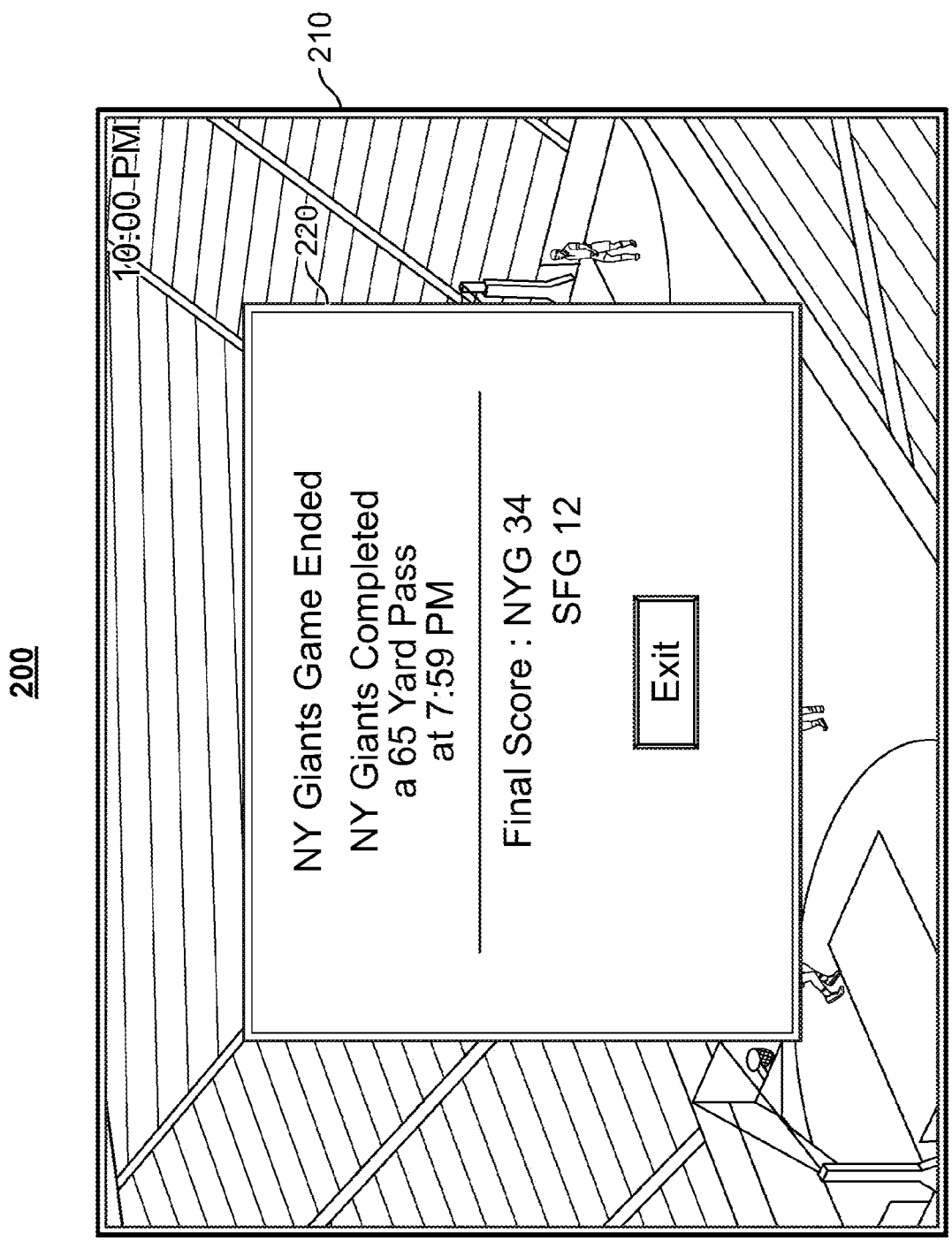
FIG. 2 shows an exemplary display screen of a delayed notification with sporting event information being provided in accordance with some embodiments of the disclosure.

The notification may be provided to the user on a second screen device or a primary device the user is using to access a media asset featuring the sporting event. However, suppose for the second user, the second level of interest of 5 does not exceed the notification frequency threshold of 5. In some embodiments, in response to determining that the second level of interest does not exceed the notification frequency threshold, the information related to the sporting event may not be presented to the user at all or may be presented at a later time (e.g., at the end of the game) rather than when the information is received during the sporting event. For example, continuing with the previous example, the media guidance application may not present the notification to the second user that includes the information when the information is received. For example, the media guidance application may delay informing the second user about a scoring event, line changes, player statistics, etc., until the end of the game or until another event happens (e.g., half-time in the game), even though the first user is informed of these updates as they take place. In particular, the first user may receive notification 120 and a second user may receive a notification 220 (FIG. 2). Specifically, notification 220 may be received at 10:00 PM by the second user informing the user about information that was received earlier at 7:59 PM. Notification 220 may be presented to the second user while the second user is accessing another media asset 210.

In some embodiments, the second level of interest may be generated by combining the interest level of the user and the performance metric based on weights assigned to these factors in a function. For example, the function may be computed in accordance with SI=x*UI+y*PM, where SI is the second interest level, UI is the user interest level in the sporting event, PM is the performance metric of the competitor, and x and y are weights. In particular, a first weight may be assigned to a first value representing interest and a second weight may be assigned to a second value representing performance. The first weight may be combined with the first level of interest to generate a first result and the second weight with the performance metric to generate a second result. For example, the level of interest in the sporting event may be multiplied by the first weight and the performance metric may be multiplied by the second weight. The first result may be combined with the second result to generate the second level of interest. For example, suppose the first weight may have a value of 0.7 and the second weight may have a value of 0.3. Continuing with the previous example, the user interest level of 5 may be multiplied by the first weight 0.7 to generate the first result of 3.5 and the performance metric of 1 may be multiplied by the second weight 0.3 to generate the second result of 0.3. Combining these two results may return a value of 3.8 for the second level of interest. In such cases, despite a maximum level of interest the user has in the sporting event, the notification threshold may not be exceeded because of the low value of the weight associated with the interest level of the user. The weights may be set to any positive or negative integer or non-integer value.

The weights may be assigned automatically or based on user input based on an importance level determined for the given factor in setting the second level of interest in receiving notifications. For example, a user may wish to have more weight given to the user's interest in the sporting event than the performance. In such cases, the user may set a higher weight value to the interest level than the performance. This may result in a greater likelihood of the user being notified in case of an event update even though the interest level is low and the performance metric is high. In some implementations, the weights may be assigned automatically based on predetermined values.

In some embodiments, the weights may be assigned based on information gathered from a social network. For example, a social network may be accessed to determine an amount of chatter related to the sporting event. For example, the media guidance application may identify communications posted by various users to a social network. The media guidance application may process these communications to determine which of the communications relate to the sporting event. This may be performed by analyzing keywords in the communications and comparing the keywords to metadata associated with the sporting event to identify matches. The media guidance application may set a time threshold to measure how many communications are posted to the network related to the sporting event within the time threshold. If a sufficient number is detected (e.g., more than a threshold number within the time threshold), the system may determine that the sporting event is trending. In such circumstances, the media guidance application may dynamically adjust the second weight based on the amount of chatter relating to the sporting event. For example, the system may increase the weight assigned to the performance metric. This may result in the user being notified about updates during the sporting event even though the user may not be interested in the sporting event and/or the performance metric is low. In particular, if the sporting event is trending the system may increase the second weight to have a value of 5. In computing the second interest level, the result may be invariable more than 5 which may result in the notification frequency threshold being exceeded despite a low value of user interest in the sporting event (e.g., 2) and a low value of competitor performance metric (e.g., 1).

In some embodiments, the information relating to the sporting event is received by detecting that the sporting event has concluded. In such cases, score information relating to the sporting event is accessed (e.g., from one of the above sources) in response to detecting that the sporting event has concluded to retrieve a final outcome of the sporting event. In some implementations, the competitor is a team and a database is searched to find the sporting event and to analyze the final outcome to determine whether the team won or lost the sporting event. In some embodiments, conclusion of the sporting event may include the end of one particular game a team is playing and/or the end of a season of the sporting event (e.g., the end of the final round in a tournament).

In some embodiments, the information includes at least one of a score during the sporting event, competitor information associated with a competitor in the sporting event, competitor information associated with a competitor related to the sporting event, and player information. In addition, the information may be received before the sporting even concludes. In such cases, in response to determining that the second level of interest does not exceed the notification frequency threshold, the information related to the sporting event may be stored. For example, the information may be stored on a server or at the user device. Conclusion of the sporting event may be detected and, in response, at such time, the notification may be presented to the user that includes the information related to the sporting event. In some embodiments, conclusion of the sporting event may include the end of one particular game a team is playing and/or the end of a season of the sporting event (e.g., the end of the final round in a tournament).

In some embodiments, the information includes a final score in the sporting event. In such cases, the performance metric is determined to indicate that the competitor has lost the sporting event based on the final score. The notification is prevented from being presented to the user in response to determining that the performance metric indicates that the competitor has lost. For example, suppose the user has a high level of interest in the sporting event and that the performance metric indicates that the user's team has lost. In such cases, the media guidance application may determine that the second level of interest is lower than a threshold and prevent notifying the user about the final score. In particular, although the user is interested in the football game, the system may not inform the user about the game if the user's team lost.

In some embodiments, the media guidance application determines at least one of a type associated with the sporting event and a competition level associated with the sporting event. For example, the media guidance application may determine that the type of sporting event is a football game and the competition level is a round in playoffs or a tournament in the sport. The media guidance application may search a database, based on the determined at least one of the type and the competition level, to identify the notification frequency threshold of a plurality of notification frequency thresholds that is associated with the at least one of the type and the competition level, wherein a first notification frequency threshold associated with at least one of a first type of sporting event and a first competition level is lower than a second notification frequency threshold associated with at least one of a second type of sporting event and a second competition level.

In some embodiments, the media guidance application may determine an amount representing a difference between the notification frequency threshold and the second level of interest. For example, the media guidance application may subtract the value of the notification frequency threshold from the determined second level of interest. Continuing with the previous example, suppose the threshold is set to 5 and the second level of interest is determined to be 6. In such cases, the difference may be determined to be 1. The media guidance application may compare the difference to a device threshold and select a first device or a second device based on the device threshold. For example, a first device of a plurality of devices associated with the user may be selected in response to determining that the amount exceeds the device threshold. A second device of the plurality of devices associated with the user may be selected in response to determining that the amount does not exceed the device threshold. The notification is caused to be presented to the user at the selected one of the first and second devices. The device threshold may determine which device the user receives notifications at. For example, different devices may be associated with different thresholds. The selection of the device may be determined based on how close or far the second level of interest is determined to be to the notification frequency threshold. This may determine the level of urgency such that if the second level of interest is very close to the notification frequency threshold, a device with low priority is selected (e.g., a mobile phone) whereas if the second level of interest is very far and exceeds the notification frequency threshold, a device with high priority is selected (e.g., a television being used to consume a media asset).

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, web-sites, and any other type of guidance data that is helpful for a user to navigate among and locate desired content selections.

Figure 3:
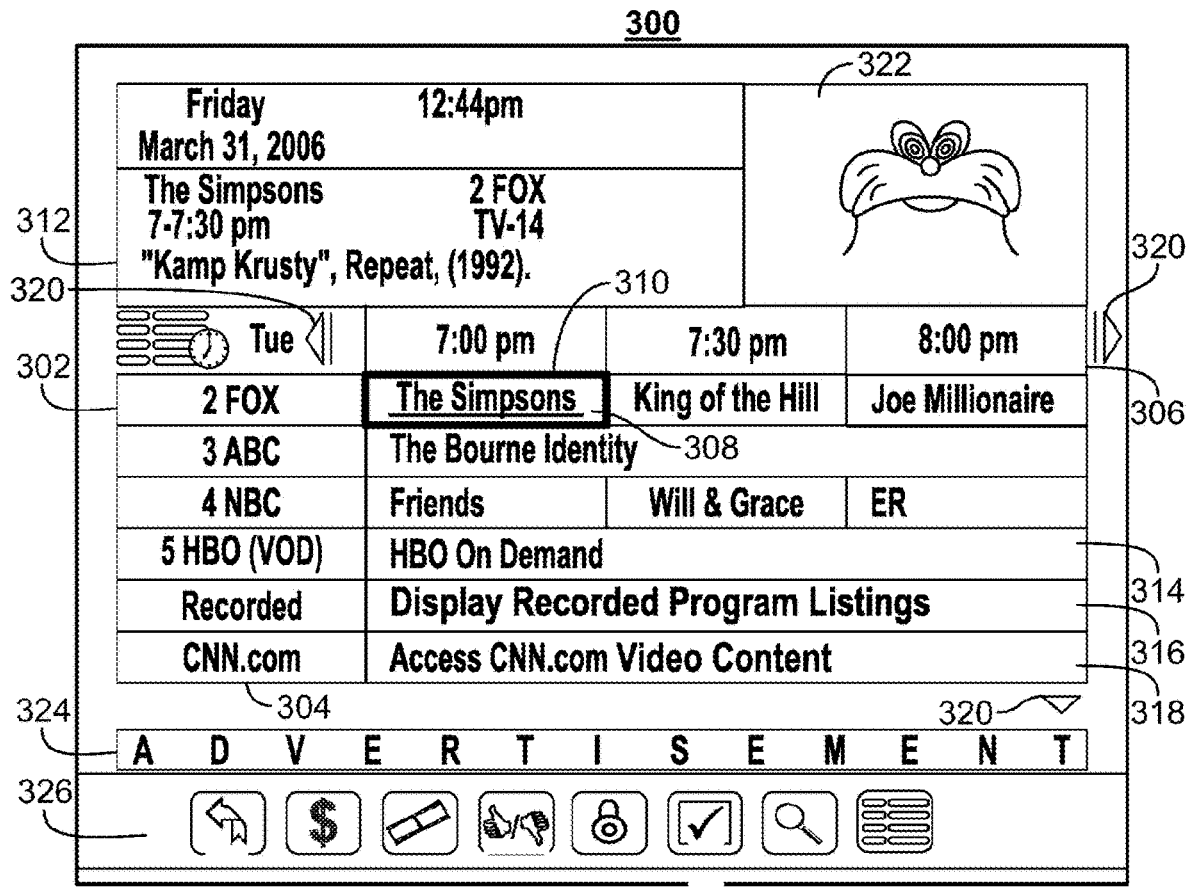
FIG. 3 shows an illustrative display screen that may be used to provide media guidance data in accordance with some embodiments of the disclosure.
Figure 4:
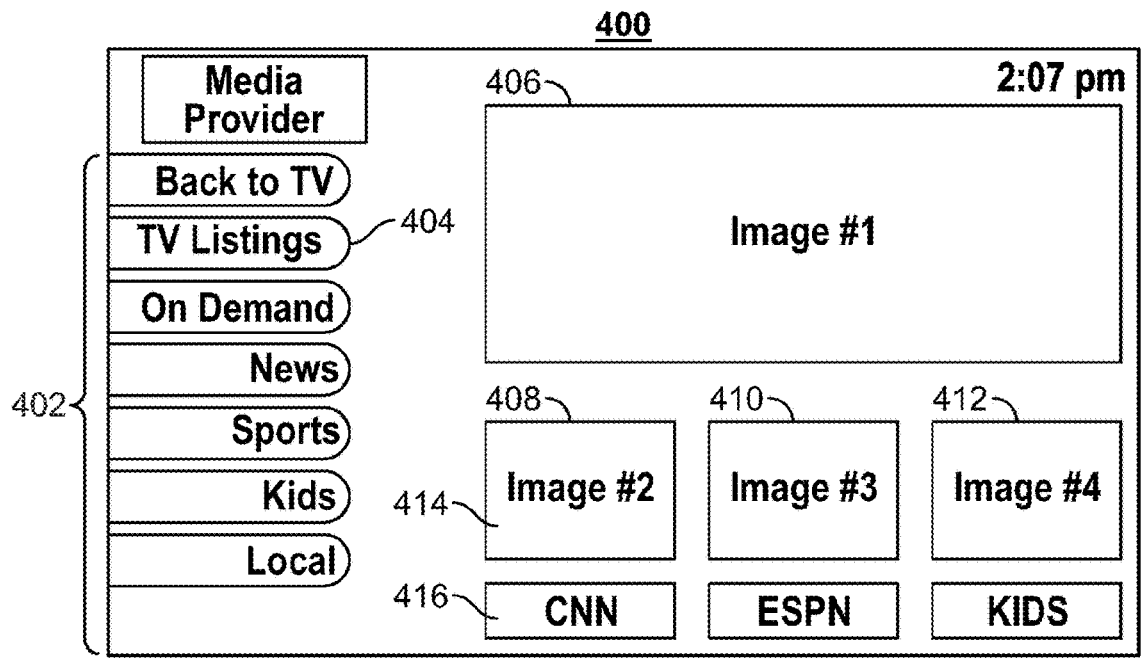
FIG. 4 shows an illustrative display screen that may be used to provide media guidance data in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
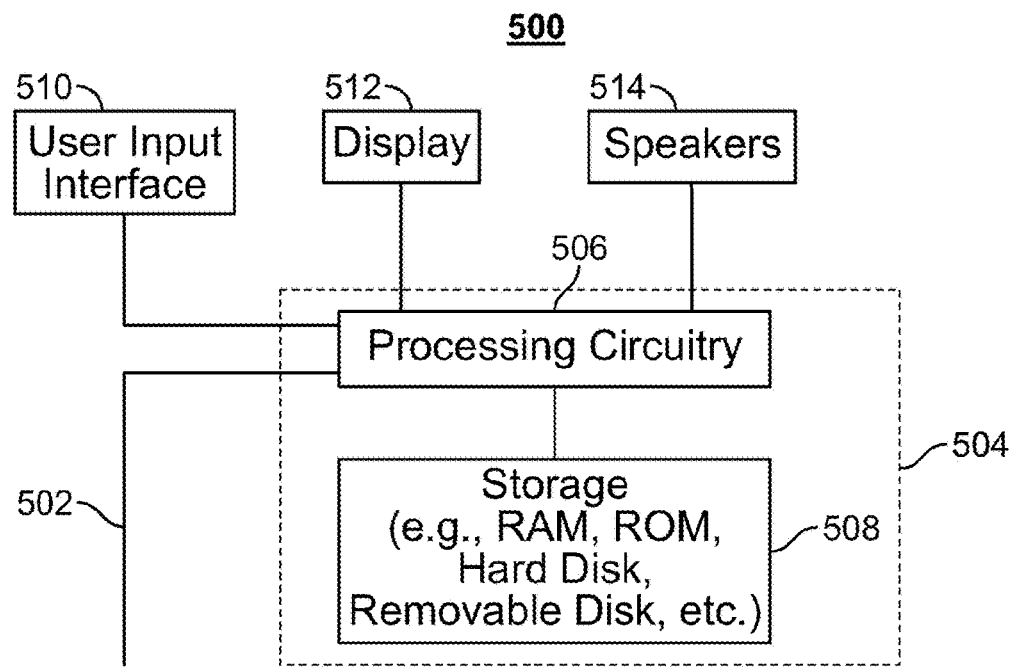
FIG. 5 shows a generalized embodiment of a device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
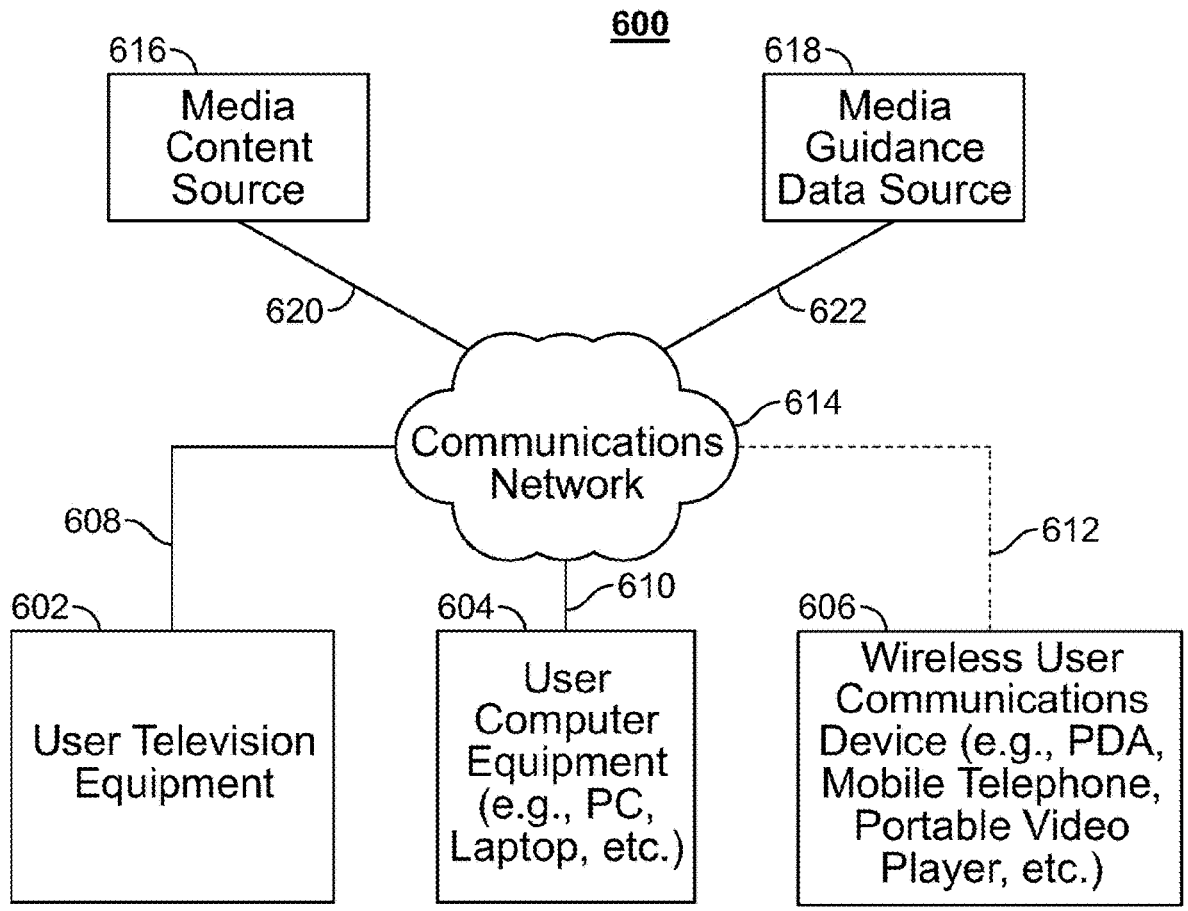
FIG. 6 shows a specific implementation of user devices in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
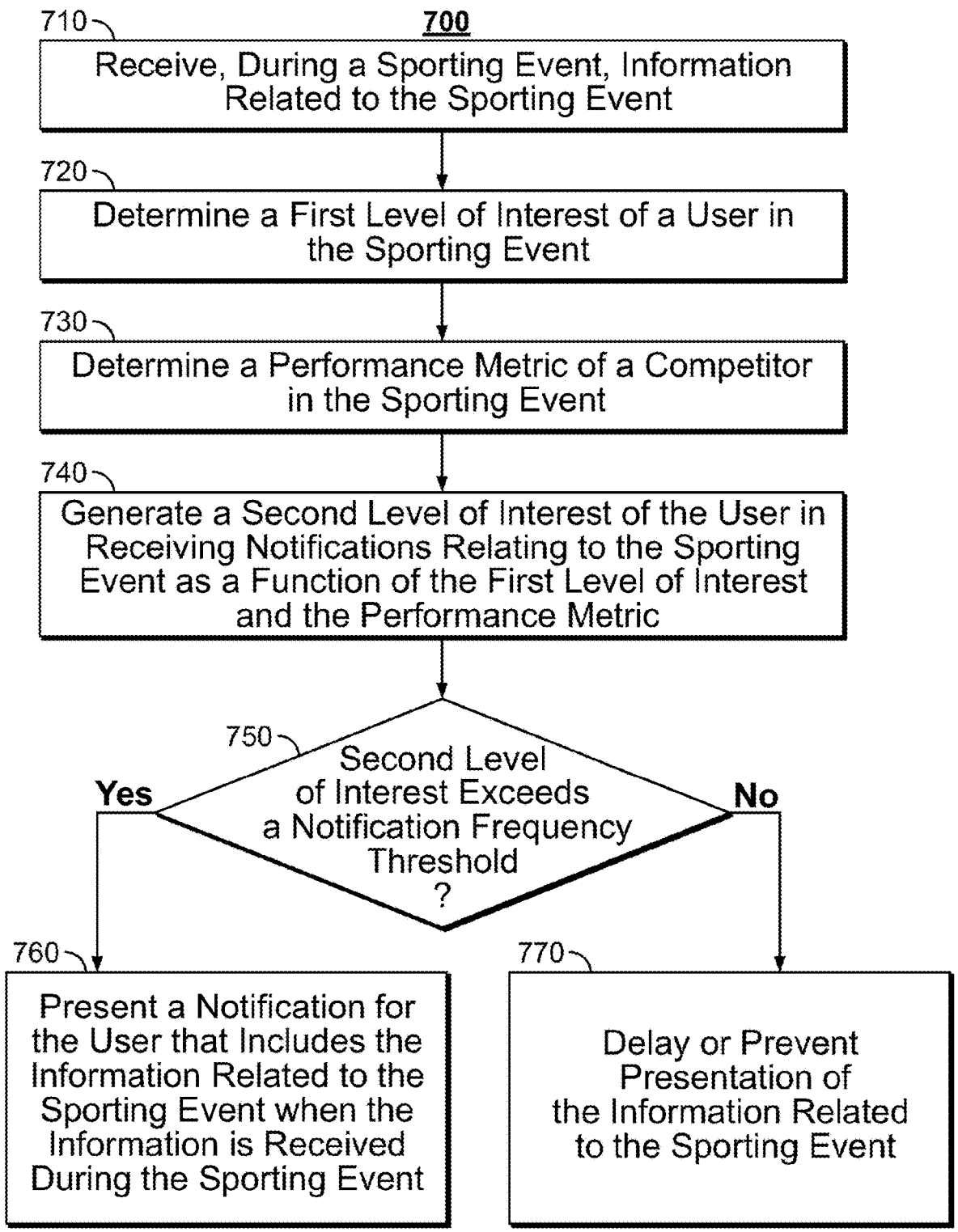
FIG. 7 is a flowchart representing an illustrative process for dynamically adjusting notification frequency for a sporting event in accordance with some embodiments of the disclosure.

FIG. 7 is a flowchart of a detailed illustrative process for dynamically adjusting notification frequency for a sporting event in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 9)) in order to dynamically adjust notification frequency for a sporting event. In addition, one or more steps of process 700 may be incorporated into or combined with one or more steps of any other process or embodiment (e.g., as described in relation to FIGS. 1, 2, and 7-10).

At step 710, information related to the sporting event is received during a sporting event. For example, control circuitry 504 may identify a competitor of interest to the user (e.g., NY Giants). Control circuitry 504 may search a sports database for any current games featuring the competitor and may retrieve from the database current sporting event information (e.g., current plays, a current score, scoring events, line changes, coach information, etc.).

At step 720, a determination is made of a first level of interest of a user in the sporting event. For example, control circuitry 504 may access a stored profile for a user and retrieve one or more levels (e.g., levels in the range of 1-5) for the user for various attributes (e.g., sport types, players, coaches, teams, etc.).

At step 730, a determination is made of a performance metric of a competitor in the sporting event. For example, control circuitry 504 may process the received information to determine a performance metric of the user's team. In some embodiments, the performance metric may be specified in the information that is received. In some embodiments, the performance metric may be searched for in response to determining that information pertaining to the event has been received. For example, the information associated with the sporting event may specify that a first team (e.g., SFG) has scored a touchdown in the game. In response to receiving this information, control circuitry 504 may identify a performance metric associated with a competitor in the sporting event. For example, control circuitry 504 may identify a current score in the game of a second team that the user is interested in (e.g., NY Giants). In some implementations, the information associated with the sporting event may specify that the user's team (e.g., NY Giants) has scored, which is the same as the performance metric that is determined.

At step 740, a second level of interest of the user in receiving notifications relating to the sporting event is generated as a function of the first level of interest and the performance metric. For example, control circuitry 504 may add the user's level of interest in the sporting event (e.g., a level of 5 interest in football games) with the performance metric (e.g., a current score of the user's team).

At step 750, a determination is made as to whether the second level of interest exceeds a notification frequency threshold. In response to determining that the second level of interest exceeds a notification frequency threshold, the process proceeds to step 760; otherwise the process proceeds to step 770.

At step 760, a notification is presented for the user that includes the information related to the sporting event when the information is received during the sporting event. For example, control circuitry 504 may present notification 120 (FIG. 1) if the user's team is winning (e.g., the performance metric is high) and/or the user has high interest in football games. Notification 120 may specify the received information (e.g., the NY Giants have completed a pass) if the user's team is winning and the user has a high interest in football games.

At step 770, presentation of the information related to the sporting event is delayed or prevented. For example, control circuitry 504 may delay notification 220 (FIG. 2) if the user's team (e.g., SFG) is losing (e.g., the performance metric is low) and/or the user has low interest in football games. Notification 220 may specify at the current time of 10:00 PM that the received information (e.g., the NY Giants have completed a pass) was received earlier at 7:59 PM.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
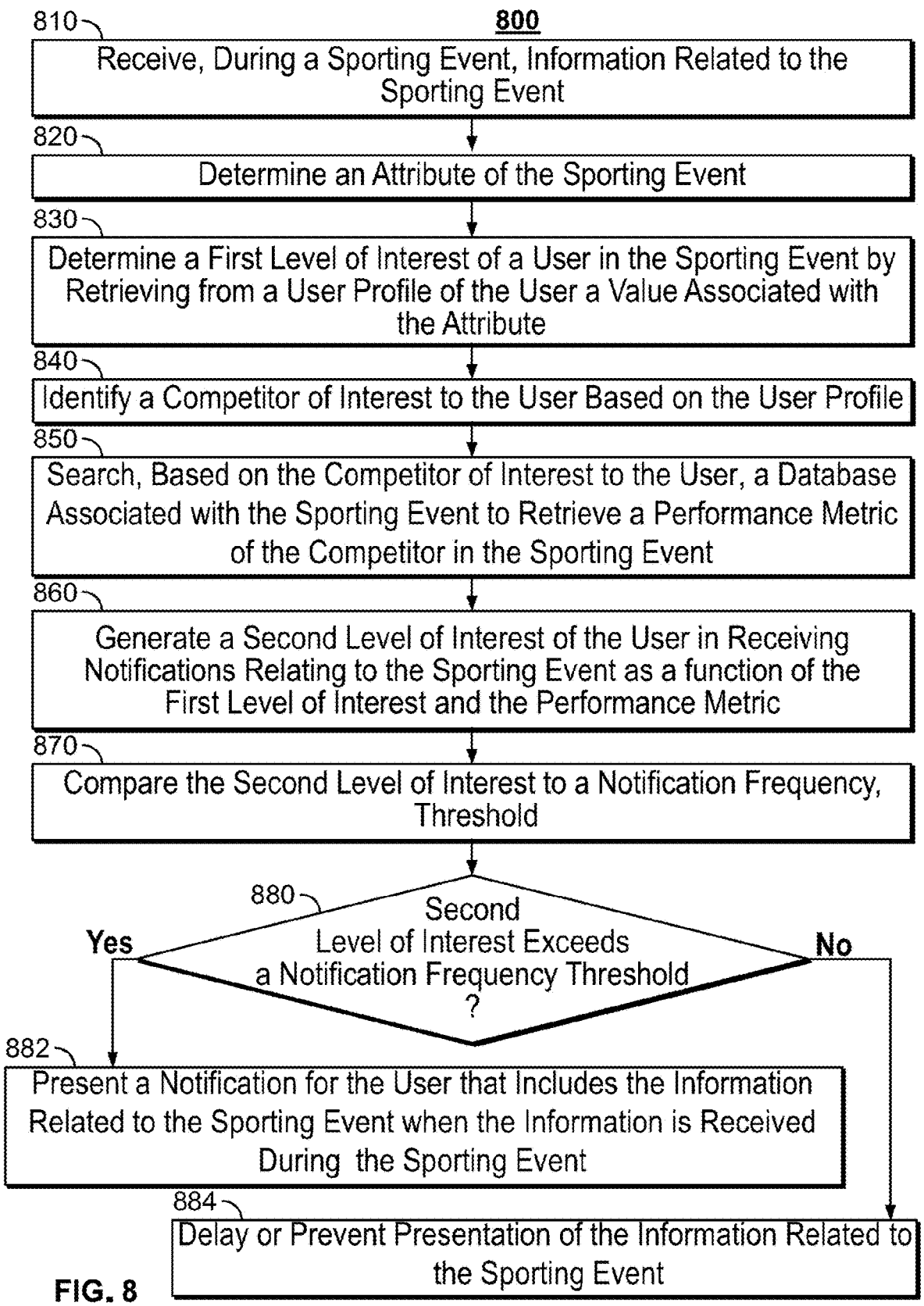
FIG. 8 is a flowchart representing an illustrative process for dynamically adjusting notification frequency for a sporting event in accordance with some embodiments of the disclosure.

FIG. 8 is a flowchart of a detailed illustrative process for dynamically adjusting notification frequency for a sporting event in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606) in order to dynamically adjust notification frequency for a sporting event. In addition, one or more steps of process 800 may be incorporated into or combined with one or more steps of any other process or embodiment (e.g., as described in relation to FIGS. 1, 2, and 7-10).

At step 810, information related to the sporting event is received during a sporting event. For example, control circuitry 504 may identify a competitor of interest to the user (e.g., NY Giants). Control circuitry 504 may search a sports database for any current games featuring the competitor and may retrieve from the database current sporting event information (e.g., current plays, a current score, scoring events, line changes, coach information, etc.).

At step 820, an attribute of the sporting event is determined. For example, control circuitry 504 may access metadata associated with the sporting event by searching a database of sporting events. Control circuitry 504 may determine the attribute from the metadata. The attribute may be a team in the sporting event, player in the sporting event, type of sporting event (e.g., football or hockey), level in a competition, level in a tournament, etc.

At step 830, a first level of interest of a user in the sporting event is determined by retrieving from a user profile of the user a value associated with the attribute. For example, control circuitry 504 may access a stored profile for a user and retrieve one or more levels (e.g., levels in the range of 1-5) for the user for the determined attribute (e.g., sport types, players, coaches, teams, etc.).

At step 840, a competitor of interest to the user is identified based on the user profile. For example, control circuitry 504 may determine that the user is a fan of a given team (e.g., NY Giants).

At step 850, a database associated with the sporting event is searched, based on the competitor of interest to the user, to retrieve a performance metric of the competitor in the sporting event. For example, control circuitry 504 may search a database to determine a current score of the user's team (e.g., NY Giants), a current position in the tournament, or any other sports information associated with the user's team.

At step 860, a second level of interest of the user in receiving notifications relating to the sporting event is generated as a function of the first level of interest and the performance metric. For example, control circuitry 504 may add the user's level of interest in the sporting event (e.g., a level of 5 interest in football games) with the performance metric (e.g., a current score of the user's team). For example, the second level of interest may be a high value if the user is not a fan of the sporting event (e.g., has a level of 1 for football) but the sporting event is the final round in a tournament (e.g., the performance metric indicates the level in the tournament is the final round and is therefore set to the maximum value of 5).

At step 870, the second level of interest is compared to a notification frequency threshold. The threshold may be predetermined, set by a user, determined based on a social network, be dynamically adjusted based on trending information, etc.

At step 880, a determination is made as to whether the second level of interest exceeds a notification frequency threshold. In response to determining that the second level of interest exceeds a notification frequency threshold, the process proceeds to step 882; otherwise the process proceeds to step 884.

At step 882, a notification is presented for the user that includes the information related to the sporting event when the information is received during the sporting event. For example, control circuitry 504 may present notification 120 (FIG. 1) if the user's team is winning (e.g., the performance metric is high) and/or the user has high interest in football games. Notification 120 may specify the received information (e.g., the NY Giants have completed a pass) if the user's team is winning and the user has a high interest in football games.

At step 884, presentation of the information related to the sporting event is delayed or prevented. For example, control circuitry 504 may delay notification 220 (FIG. 2) if the user's team (e.g., SFG) is losing (e.g., the performance metric is low) and/or the user has low interest in football games. Notification 220 may specify at the current time of 10:00 PM that the received information (e.g., the NY Giants have completed a pass) was received earlier at 7:59 PM.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
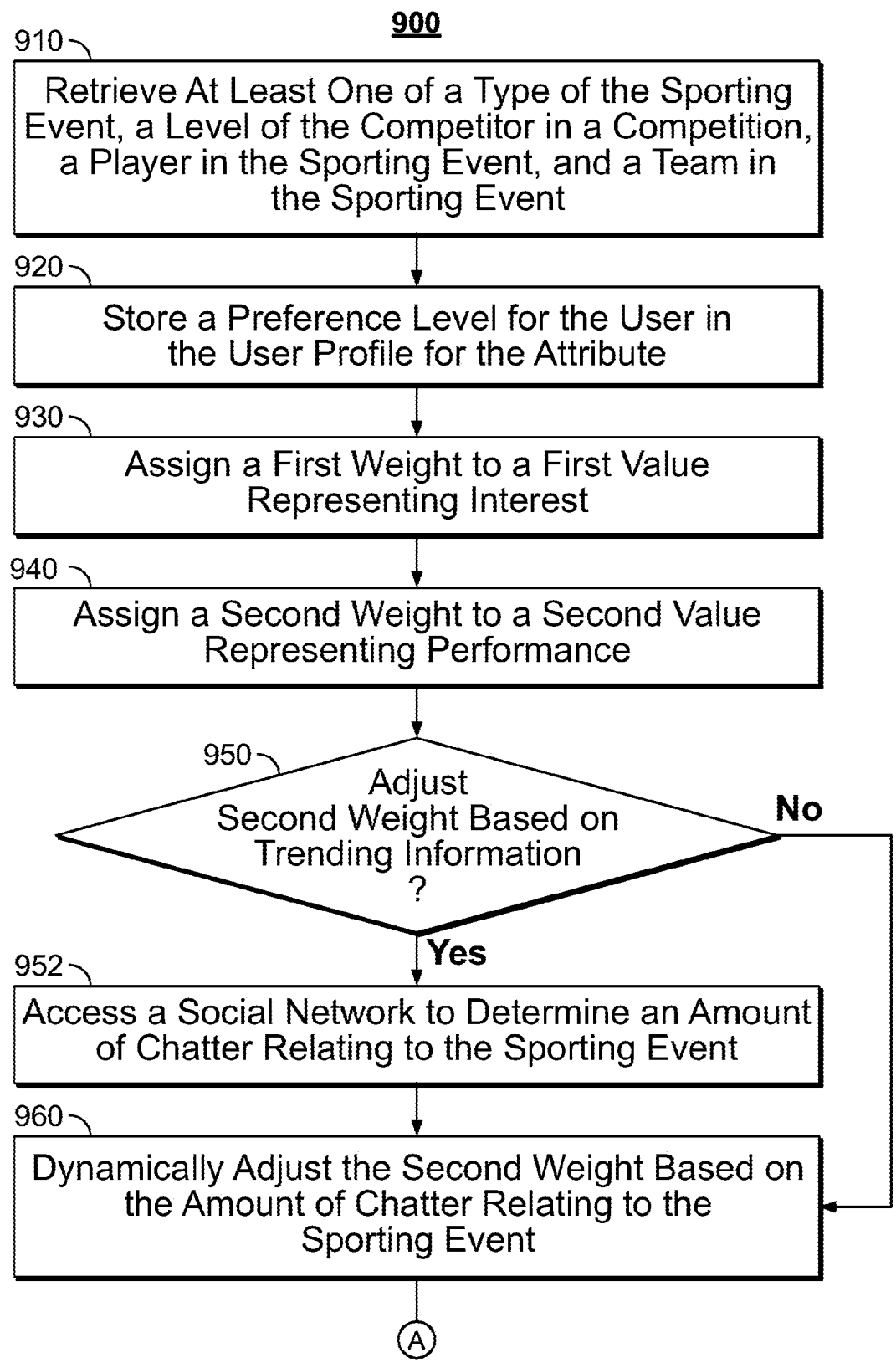
FIG. 9 is a flowchart representing an illustrative process for computing a level of interest in a notification in accordance with some embodiments of the disclosure.
Figure 9:
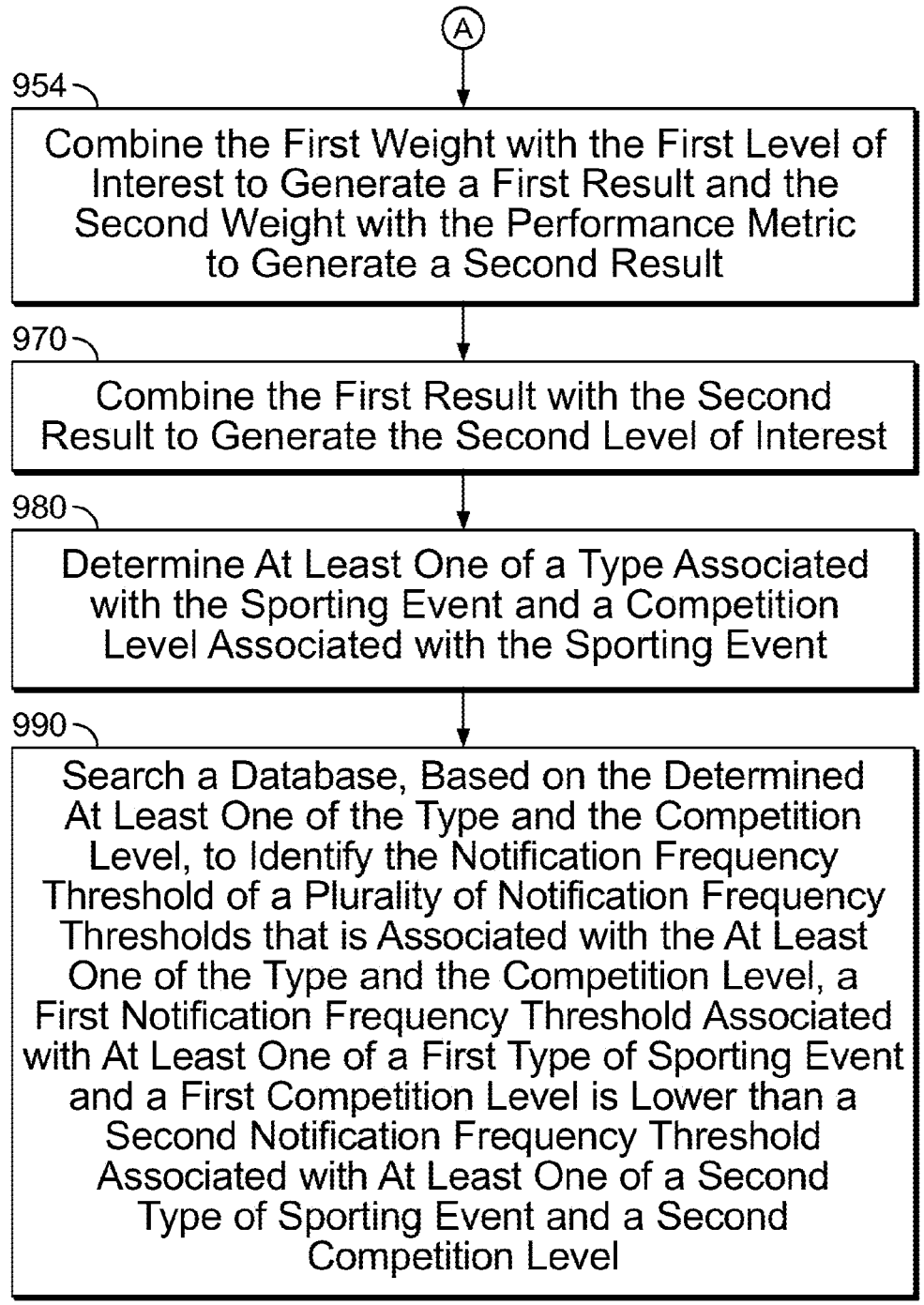

FIG. 9 is a flowchart of a detailed illustrative process for computing a level of interest in a notification in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., user equipment devices 602, 604, and/or 606) in order to compute a level of interest in a notification. In addition, one or more steps of process 900 may be incorporated into or combined with one or more steps of any other process or embodiment (e.g., as described in relation to FIGS. 1, 2, and 7-10).

At step 910, at least one of, a type of the sporting event, a level of the competitor in a competition, a player in the sporting event, and a team in the sporting event is retrieved. For example, control circuitry 504 may access a database associated with the sporting event and process metadata. From the metadata, control circuitry 504 may retrieve various information about the sporting event such as the level in the competition, player information, team information, etc.

At step 920, a preference level for the user is stored in the user profile for the attribute. For example, control circuitry 504 may automatically generate preference levels for various attributes of a sporting event and/or receive user input specifying levels for the various attributes. One way control circuitry 504 may automatically populate preference levels is based on an amount and frequency a user posts or sends messages about the sporting event and/or the various attributes to a social network.

At step 930, a first weight is assigned to a first value representing interest. For example, control circuitry 504 may automatically or based on user input set different values to weights of the level of interest that are used to compute or determine the level of interest in receiving notifications. In some implementations, if the user prefers to be more likely to receive notifications for particular performance metrics, a higher weight may be assigned to the performance metrics. Whereas if the user prefers to be more likely to receive notifications because the user is a big fan of a team but without regard to the performance metrics of the team, a higher weight may be assigned to the preference level.

At step 940, a second weight is assigned to a second value representing performance. For example, control circuitry 504 may automatically or based on user input set different values to weights of the performance metric used to compute or determine the level of interest in receiving notifications.

At step 950, a determination is made as to whether to adjust the second weight based on trending information. In response to determining to adjust the second weight based on trending information, the process proceeds to step 952; otherwise the process proceeds to step 954.

At step 952, a social network is accessed to determine an amount of chatter relating to the sporting event. For example, control circuitry 504 may access a social network associated with the user. Control circuitry 504 may identify messages sent by users on the social network related to the sporting event. Control circuitry 504 may count how many messages relate to the sporting event and that are associated with a timestamp that is within a threshold amount. When a threshold number of these messages are found on the social network within a particular range of timestamps, control circuitry 504 may determine that the sporting event and/or a performance metric in the sporting event (e.g., a particular play or a score) is trending. Control circuitry 504 may also query a database to determine whether the sporting event and/or performance metric is trending.

At step 960, the second weight is dynamically adjusted based on the amount of chatter relating to the sporting event. For example, if control circuitry 504 determines that the sporting event and/or the performance metric is trending, control circuitry 504 may increase the weight associated with the performance metric. Alternatively, if control circuitry 504 determines that the sporting event and/or the performance metric is trending, control circuitry 504 may decrease the weight associated with the performance metric.

At step 954, the first weight is combined with the first level of interest to generate a first result and the second weight with the performance metric to generate a second result. For example, control circuitry 504 may multiply the first weight with the level of user interest and may multiply the second weight with the performance metric.

At step 970, the first result is combined with the second result to generate the second level of interest. For example, control circuitry 504 may compute a sum of the first weight multiplied by the level of user interest and the second weight multiplied by performance metric.

At step 980, at least one of a type associated with the sporting event and a competition level associated with the sporting event is determined.

At step 990, a database is searched, based on the determined at least one of the type and the competition level, to identify the notification frequency threshold of a plurality of notification frequency thresholds that is associated with the at least one of the type and the competition level, a first notification frequency threshold associated with at least one of a first type of sporting event and a first competition level is lower than a second notification frequency threshold associated with at least one of a second type of sporting event and a second competition level.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
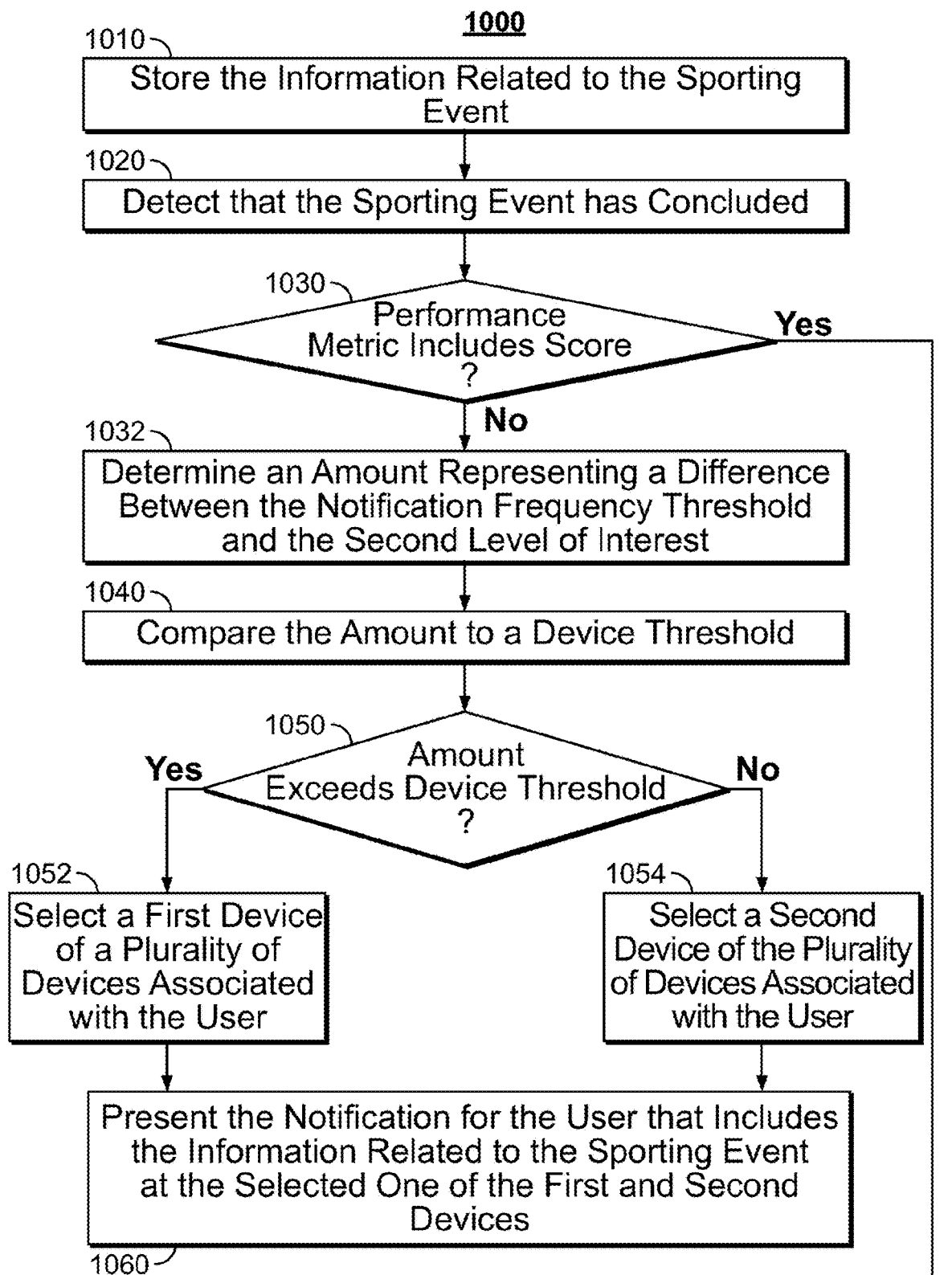
FIG. 10 is a flowchart representing an illustrative process for presenting notifications on a given device based on a sporting event score in accordance with some embodiments of the disclosure.
Figure 10:
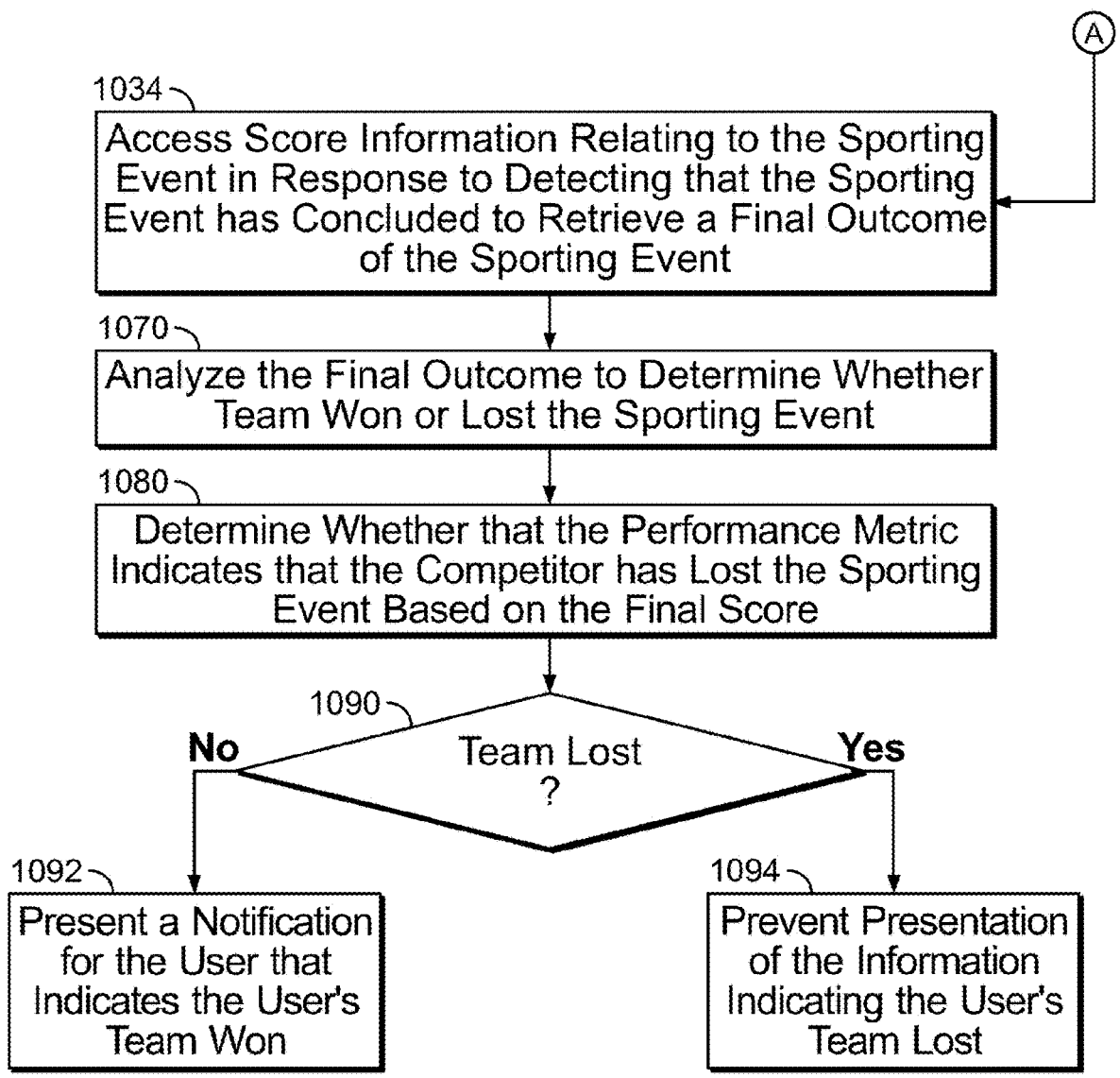

FIG. 10 is a flowchart of a detailed illustrative process for presenting notifications on a given device based on a sporting event score in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606) in order to present notifications on a given device based on a sporting event score. In addition, one or more steps of process 1000 may be incorporated into or combined with one or more steps of any other process or embodiment (e.g., as described in relation to FIGS. 1, 2, and 7-10).

At step 1010, the information related to the sporting event is stored. For example, control circuitry 504 may store in a storage device the received information (e.g., the indication that a complete pass was made in a football game). This may be used to delay when the user is informed about the information in case the interest level in receiving notifications is below a threshold.

At step 1020, a detection is made that the sporting event has concluded. For example, control circuitry 504 may query a database for the current status of the sporting event. In some implementations, control circuitry 504 may analyze media guidance data to determine that the scheduled end time of the sporting event media asset has passed. In some embodiments, conclusion of the sporting event may include the end of one particular game a team is playing and/or the end of a season of the sporting event (e.g., the end of the final round in a tournament).

At step 1030, a determination is made as to whether the performance metric includes a score. In response to determining that the performance metric includes a score, the process proceeds to step 1032; otherwise the process proceeds to step 1034.

At step 1032, an amount representing a difference between the notification frequency threshold and the second level of interest is determined. For example, control circuitry 504 may subtract the second level of interest computed in step 970 from a stored notification frequency threshold.

At step 1040, the amount is compared to a device threshold.

At step 1050, a determination is made as to whether the amount exceeds the device threshold. In response to determining that the amount exceeds the device threshold, the process proceeds to step 1052; otherwise the process proceeds to step 1054.

At step 1052, a first device of a plurality of devices associated with the user is selected. For example, control circuitry 504 may select a mobile phone of the user.

At step 1054, a second device of the plurality of devices associated with the user is selected. For example, control circuitry 504 may select a user equipment device, such as a set-top box or television of the user that is nearby the user.

At step 1060, the notification is presented for the user that includes the information related to the sporting event at the selected one of the first and second devices.

At step 1034, score information relating to the sporting event is accessed in response to detecting that the sporting event has concluded to retrieve a final outcome of the sporting event.

At step 1070, the final outcome is analyzed to determine whether team won or lost the sporting event. For example, control circuitry 504 may identify the team specified in the user's profile as the team the user is a fan of. Control circuitry 504 may find the same team in the final outcome and determine whether the score of the user's team is greater or lower than the opponent's. If the score is greater, control circuitry 504 may determine that the user's team has won.

At step 1080, a determination is made as to whether the performance metric indicates that the competitor has lost the sporting event based on the final score.

At step 1090, a determination is made as to whether the team lost. In response to determining that the team lost, the process proceeds to step 1094; otherwise the process proceeds to step 1092.

At step 1092, a notification is presented for the user that indicates the user's team won. For example, control circuitry 504 may present notification 120 with an indication that the user's team has won.

At step 1094, presentation of the information indicating the user's team lost is prevented. For example, control circuitry 504 may prevent from displaying notification 120 or 220 when the user's team lost.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    storing information related to a sporting event;

determining a level of interest of a user in receiving notifications related to the sporting event;
determining the sporting event has concluded;
determining an amount representing a difference between a notification frequency threshold and the level of interest;
comparing the amount to a device threshold; and
based at least in part on determining the amount exceeds the device threshold:
 selecting a first device of a plurality of devices associated with the user; and
 presenting a notification to the user comprising the stored information related to the sporting event, at the first device.

2. The method of claim 1, further comprising:
based at least in part on determining the amount does not exceed the device threshold:
 selecting a second device of the plurality of devices associated with the user; and
 presenting the notification to the user comprising the stored information related to the sporting event, at the second device.

3. The method of claim 1, further comprising:
based at least in part on determining a performance metric associated with the sporting event contains a score and further based at least in part on detecting the sporting event has concluded:
 accessing score information related to the sporting event to retrieve a final outcome of the sporting event;
 analyzing the final outcome to determine whether a team supported by the user won or lost the sporting event.

4. The method of claim 3, further comprising:
based at least in part on determining the team supported by the user won the sporting event:
 presenting a notification for the user indicating the team supported by the user won the sporting event.

5. The method of claim 3, further comprising:
based at least in part on determining the team supported by the user lost the sporting event:
 refraining from presenting a notification for the user indicating the team supported by the user lost the sporting event.

6. The method of claim 1, wherein the level of interest of the user in receiving notifications related to the sporting event is based on a second level of interest of the user in a performance of the sporting event.

7. The method of claim 1, further comprising:
determining at least one of a type associated with the sporting event and a competition level associated with the sporting event; and
searching a database, based on the determined at least one of the type and the competition level, to identify the notification frequency threshold of a plurality of notification frequency thresholds associated with the at least one of the type and the competition level, wherein a first notification frequency threshold associated with at least one of a first type of sporting event and a first competition level is lower than a second notification frequency threshold associated with at least one of a second type of sporting event and a second competition level.

8. The method of claim 1, wherein the information related to the sporting event comprises at least one of: a change to player statistics, a scoring event, a team formation change, a lineup change, a tournament update and timing information.

9. The method of claim 1, further comprising:
accessing a social network to determine an amount of chatter relating to the sporting event; and
dynamically adjusting a weight associated with the level of interest of the user in receiving notifications related to the sporting event based on the amount of chatter relating to the sporting event.

10. The method of claim 1, further comprising:
determining an attribute of the sporting event by:
 retrieving at least one of a type of the sporting event, a level of a competitor in a competition, a player in the sporting event, and a team in the sporting event; and
 storing a preference level for the user in a user profile for the attribute.

11. A system comprising:
a memory; and
a control circuitry configured to:
 store information related to a sporting event in the memory;
 determine a level of interest of a user in receiving notifications related to the sporting event;
 detect the sporting event has concluded;
 determine an amount representing a difference between a notification frequency threshold and the level of interest;
 compare the amount to a device threshold; and
 based at least in part on determining the amount exceeds the device threshold:
  select a first device of a plurality of devices associated with the user; and
  present a notification to the user comprising the stored information related to the sporting event, at the first device.

12. The system of claim 11, wherein the control circuitry is further configured to:
based at least in part on determining the amount does not exceed the device threshold:
 select a second device of the plurality of devices associated with the user; and
 present the notification to the user comprising the stored information related to the sporting event, at the second device.

13. The system of claim 11, wherein the control circuitry is further configured to:
based at least in part on determining a performance metric associated with the sporting event contains a score and further based at least in part on detecting the sporting event has concluded:
 access score information related to the sporting event to retrieve a final outcome of the sporting event;
 analyze the final outcome to determine whether a team supported by the user won or lost the sporting event.

14. The system of claim 13, wherein the control circuitry is further configured to:
based at least in part on determining the team supported by the user won the sporting event:
 present a notification for the user indicating the team supported by the user won the sporting event.

15. The system of claim 13, wherein the control circuitry is further configured to:
based at least in part on determining the team supported by the user lost the sporting event:

refrain from presenting a notification for the user indicating the team supported by the user lost the sporting event.

16. The system of claim 11, wherein the level of interest of the user in receiving notifications related to the sporting event is based on a second level of interest of the user in a performance of the sporting event.

17. The system of claim 11, wherein the control circuitry is further configured to:
determine at least one of a type associated with the sporting event and a competition level associated with the sporting event; and
search a database, based on the determined at least one of the type and the competition level, to identify the notification frequency threshold of a plurality of notification frequency thresholds associated with the at least one of the type and the competition level, wherein a first notification frequency threshold associated with at least one of a first type of sporting event and a first competition level is lower than a second notification frequency threshold associated with at least one of a second type of sporting event and a second competition level.

18. The system of claim 11, wherein the information related to the sporting event comprises at least one of: a change to player statistics, a scoring event, a team formation change, a lineup change, a tournament update and timing information.

19. The system of claim 11, wherein the control circuitry is further configured to:
access a social network to determine an amount of chatter relating to the sporting event; and
dynamically adjust a weight associated with the level of interest of the user in receiving notifications related to the sporting event based on the amount of chatter relating to the sporting event.

20. The system of claim 11, wherein the control circuitry is further configured to:
determine an attribute of the sporting event by:
retrieving at least one of a type of the sporting event, a level of a competitor in a competition, a player in the sporting event, and a team in the sporting event; and
storing a preference level for the user in a user profile for the attribute.

* * * * *